US011775830B2

(12) United States Patent
Qin et al.

(10) Patent No.: US 11,775,830 B2
(45) Date of Patent: *Oct. 3, 2023

(54) TRAINING MORE SECURE NEURAL NETWORKS BY USING LOCAL LINEARITY REGULARIZATION

(71) Applicant: DeepMind Technologies Limited, London (GB)

(72) Inventors: Chongli Qin, London (GB); Sven Adrian Gowal, Cambridge (GB); Soham De, London (GB); Robert Stanforth, Dorking (GB); James Martens, London (GB); Krishnamurthy Dvijotham, London (GB); Dilip Krishnan, Arlington, MA (US); Alhussein Fawzi, St. Albans (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,791

(22) Filed: Dec. 12, 2022

(65) Prior Publication Data

US 2023/0252286 A1  Aug. 10, 2023

Related U.S. Application Data

(63) Continuation of application No. 16/882,332, filed on May 22, 2020, now Pat. No. 11,526,755.

(Continued)

(51) Int. Cl.
*G06N 3/08* (2023.01)
*G06V 10/82* (2022.01)
(Continued)

(52) U.S. Cl.
CPC ............. *G06N 3/08* (2013.01); *G06F 18/214* (2023.01); *G06F 18/21355* (2023.01);
(Continued)

(58) Field of Classification Search
CPC ... G06N 3/08; G06F 18/21355; G06F 18/214; G06V 10/764; G06V 10/774; G06V 10/82
See application file for complete search history.

(56) References Cited

U.S. PATENT DOCUMENTS

2019/0188573 A1*  6/2019  Lehman ................. G06N 3/084

OTHER PUBLICATIONS

Miyato et al, "Virtual Adversarial Training: A Regularization Method for Supervised and Semi-Supervised Learning" (published at https://arxiv.org/abs/1704.03976, Jun. 2018) (Year: 2018).*

* cited by examiner

*Primary Examiner* — Casey L Kretzer
(74) *Attorney, Agent, or Firm* — Fish & Richardson P.C.

(57) ABSTRACT

Methods, systems, and apparatus, including computer programs encoded on computer storage media, for training a neural network. One of the methods includes processing each training input using the neural network and in accordance with the current values of the network parameters to generate a network output for the training input; computing a respective loss for each of the training inputs by evaluating a loss function; identifying, from a plurality of possible perturbations, a maximally non-linear perturbation; and determining an update to the current values of the parameters of the neural network by performing an iteration of a neural network training procedure to decrease the respective losses for the training inputs and to decrease the non-linearity of the loss function for the identified maximally non-linear perturbation.

20 Claims, 4 Drawing Sheets

Related U.S. Application Data

(60) Provisional application No. 62/852,298, filed on May 23, 2019.

(51) Int. Cl.
*G06F 18/214* (2023.01)
*G06F 18/2135* (2023.01)
*G06V 10/764* (2022.01)
*G06V 10/774* (2022.01)

(52) U.S. Cl.
CPC .......... *G06V 10/764* (2022.01); *G06V 10/774* (2022.01); *G06V 10/82* (2022.01)

TRAINING MORE SECURE NEURAL NETWORKS BY USING LOCAL LINEARITY REGULARIZATION

CROSS-REFERENCE TO RELATED APPLICATIONS

This is a continuation of U.S. application Ser. No. 16/882,332, filed on May 22, 2020, which claims priority to U.S. Provisional Application No. 62/852,298, filed on May 23, 2019. The disclosures of the prior applications are considered part of and are incorporated by reference in the disclosure of this application.

BACKGROUND

This specification relates to training neural networks that are secure, i.e., that are robust to attacks from malicious actors.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network to be resistant to adversarial attacks.

According to an aspect, there is provided a method of training a neural network having a plurality of network parameters, in particular to provide a more secure neural network (a method of increasing the security of the neural network). The method may comprise obtaining a plurality of training inputs and for each of the plurality of training inputs, a respective target output for the training input. The method may further comprise training the neural network on each of the plurality of training inputs. The training may comprise processing each of the training inputs using the neural network and in accordance with current values of the network parameters to generate a respective network output for each of the training inputs. The training may further comprise computing a respective loss for each of the training inputs by evaluating a loss function. The loss function may measure a difference between (i) an output generated by the neural network by processing an input in an input-output pair and (ii) an output in the input-output pair. Computing the loss for each of the training inputs may comprise evaluating the loss function at the input-output pair that includes the training input and the target output for the training input. The training may further comprise identifying, from a plurality of possible perturbations, a maximally non-linear perturbation. The maximally non-linear perturbation may be a perturbation for which the loss function is most non-linear when evaluated at an input-output pair that includes (i) a perturbed training input generated by applying the possible perturbation to a given training input and (ii) a target output for the given training input. The training may further comprise determining an update to the current values of the parameters of the neural network by performing an iteration of a neural network training procedure to decrease the respective losses for the training inputs and to decrease the non-linearity of the loss function for the identified maximally non-linear perturbation.

The method may comprise the following features. The training inputs may be images. Identifying the maximally non-linear perturbation may comprise initializing a perturbation.

The identification may further comprise, for each of one or more iterations, the following features (in isolation or in combination): for each of the training inputs, generating a respective perturbed training input by applying the perturbation to the training input. For each of the training inputs, processing the perturbed training input using the neural network and in accordance with the current values of the network parameters to generate a network output for the perturbed training input. For each of the training inputs, determining, using the network output for the perturbed training input, a gradient of a local linearity measure with respect to the perturbation and evaluated at the perturbed input for the training input. The local linearity measure may measure how non-linear the loss function is when evaluated at an input-output pair that includes (i) the perturbed training input and (ii) the target output for the training input. The identification may further comprise generating an averaged gradient of the local linearity measure by averaging the gradients for the training inputs. The identification may further comprise updating the perturbation using the averaged gradient. The identification may further comprise selecting the perturbation after the last iteration of the one or more iterations as the maximally non-linear perturbation.

The local linearity measure may be an absolute difference between (1) the loss function evaluated at the input-output pair that includes (i) the perturbed training input and (ii) the target output for the training input and (2) a first-order Taylor expansion of the loss function evaluated at the input-output pair. Determining the update to the current values of the parameters of the neural network may comprise: performing the iteration of the neural network training procedure to minimize a local linearity regularized loss function that measures at least the respective losses for the plurality of training inputs and the non-linearity for the identified maximally non-linear perturbation.

Performing the iteration of the neural network training procedure may comprise: determining a respective gradient with respect to the network parameters of the local linearity regularized loss function for each of the plurality of training examples. The performing may further comprise determining an averaged gradient with respect to the network parameters from the respective gradients for the plurality of training examples. The performing may further comprise determining an update to the current values of the network parameters from the averaged gradient. The performing may further comprise generating updated values of the network parameters by applying the update to the current values of the network parameters.

The local linearity regularized loss function may include a first term that measures an average loss for the plurality of training examples. The local linearity regularized loss function may include a second term that measures an average across the plurality of training inputs of an absolute difference between (i) the loss function evaluated at an input-output pair that includes 1) the training input perturbed with the maximally non-linear perturbation and 2) the target output for the training input and (ii) a first-order Taylor expansion of the loss function evaluated at the input-output pair that includes 1) the training input perturbed with the maximally non-linear perturbation and 2) the target output for the training input. The local linearity regularized loss function may include a third term that measures an average across the plurality of training inputs of an absolute value of a dot product between the maximally non-linear perturbation and a gradient with respect to the training input of the loss function evaluated at the input-output pair that includes the training input and the target output for the training input.

The method may be used to adapt an existing neural network to improve the neural network's security.

According to another aspect, there is provided a system comprising one or more computers and one or more storage devices storing instructions that when executed by the one or more computers cause the one or more computers to perform the operations of the above method aspect.

According to a further aspect, there is provided one or more computer storage media storing instructions that when executed by one or more computers cause the one or more computers to perform the operations of the above method aspect.

It will be appreciated that features described in the context of one aspect may be combined with features of another aspect.

Particular embodiments of the subject matter described in this specification can be implemented so as to realize one or more of the following advantages.

By training a neural network as described in this specification, the neural network becomes more secure than neural networks trained using conventional approaches, i.e., because the trained neural network becomes less susceptible to adversarial attacks than the neural networks that are trained using conventional approaches. An adversarial attack occurs when a malicious attacker intentionally submits inputs to the neural network in an attempt to cause undesired behavior, i.e., to cause incorrect outputs to be generated by the neural network. For example, an attacker may submit inputs to an image classification neural network that appear to the human eye to be of one object category but that have been slightly perturbed in an attempt to cause the neural network to misclassify the inputs. Thus, because the system becomes more resistant to these types of attacks, the security of the computer system that includes the neural network is improved.

In one example, the system may be a biometric authentication system. The neural network may be configured to recognize facial images, fingerprints, voice patterns or other types of biometric data. An adversarial attack may attempt to cause the neural network to misclassify input biometric data. In another example, the system may be a network security system. The neural network may be configured to detect malicious or suspicious data on the network. An adversarial attack may attempt to cause the neural network to fail to detect such data. In a further example, the system may be an autonomous vehicle or robotic system. The neural network may be configured to control its operation. An adversarial attack may take the form of a malicious signal or an alteration in the environment such as an altered road sign to attempt to cause the neural network to provide a different control output than would otherwise be expected.

Conventional techniques, e.g., adversarial training techniques, for training neural networks to be more resistant to adversarial attack significantly increase the computational resource consumption, e.g., processor cycles, and wall clock time consumed by the training process. This is particularly true when the neural network is complex, i.e., has a large amount of parameters, and the inputs to the network are high-dimensional, e.g., images with relatively high resolution, as is required for many industrial applications.

The described techniques, however, match or even exceed the performance of these conventional techniques while being much more computationally efficient, at least in part because identifying the maximally non-linear perturbation requires many fewer computationally intensive and time consuming gradient steps than is required to find a strong adversarial perturbation using existing techniques.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
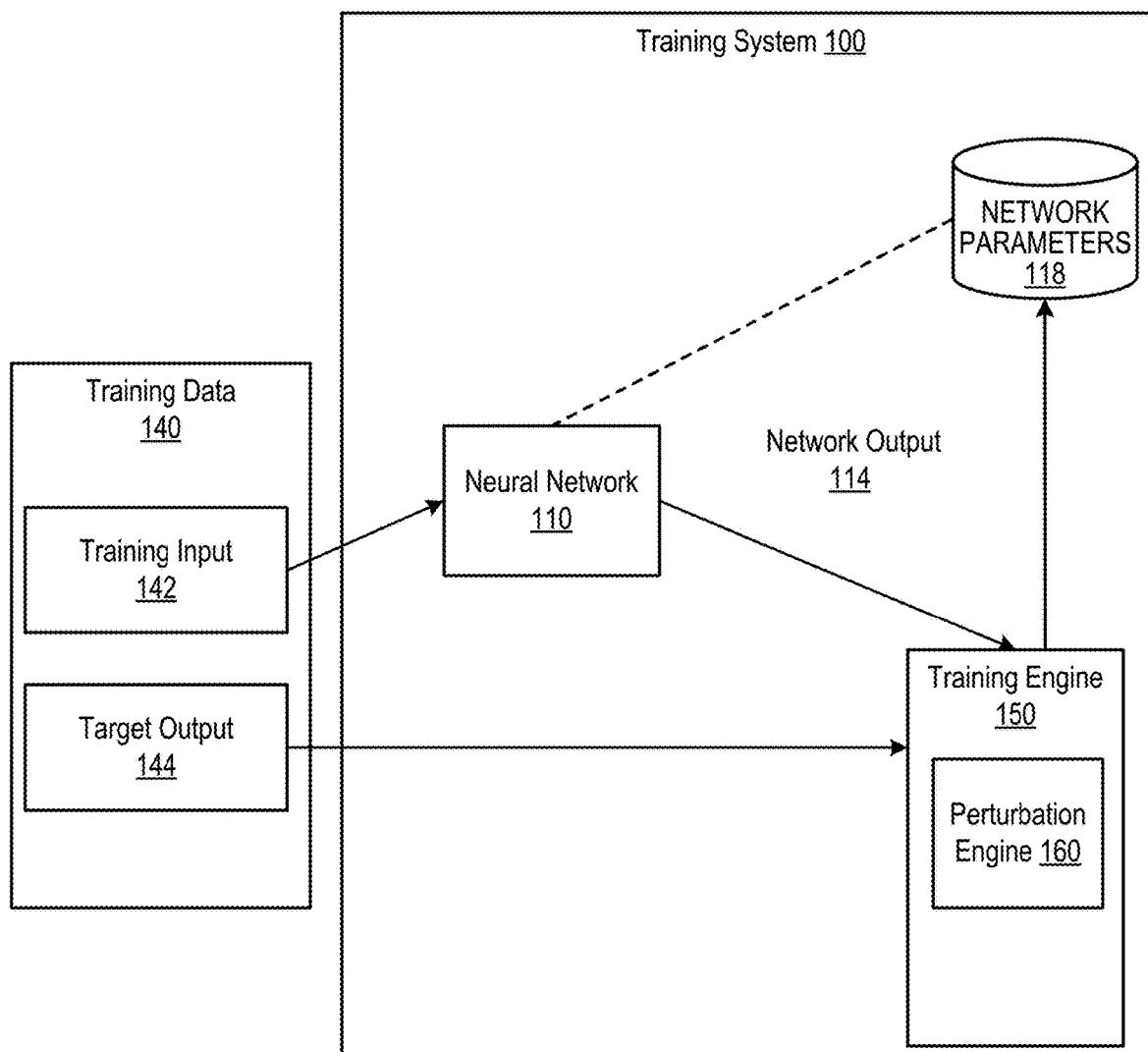
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that trains a neural network 110 on training data 140 to determine trained values of the parameters of the neural network (referred to as network parameters 118).

The neural network 110 can be configured to receive any kind of digital data input as a network input and to generate any kind of network output, i.e., any kind of score, classification, or regression output based on the network input.

In particular, the described techniques can be used to train a neural network 110 to perform any task that requires receiving continuous inputs, i.e., inputs that can take any value from some predetermined range.

For example, if the inputs to the neural network are images or features that have been extracted from images, the output generated by the neural network for a given image may be an image classification output that includes scores for each of a set of object categories, with each score representing an estimated likelihood that the image contains an image of an object belonging to the category.

As another example, if the inputs to the neural network are images, the output generated by the neural network for a given image may be an objection detection output that identifies positions of objects within the given image.

As another example, if the inputs to the neural network are images, the output generated by the neural network for a given image may be an image segmentation output that identifies, for each pixel of the given input image, a category from a set of possible categories that the scene depicted at the pixel belongs to.

As another example, if the inputs to the neural network are sensor data characterizing a state of an environment being interacted with by an agent, e.g., image data, position data, or other sensor data captured by sensors of a robot or other agent, the output generated by the neural network data can be a control policy for controlling the agent, e.g., data defining a probability distribution over possible actions that can be performed by the agent. As particular examples, sensor data the sensor data can be data from an image, distance, or position sensor or from an actuator. For example in the case of a robot, the sensor data may include data characterizing the current state of the robot, e.g., one or more of: joint position, joint velocity, joint force, torque or acceleration, e.g., gravity-compensated torque feedback, and global or relative pose of an item held by the robot. The sensor data may also include, for example, sensed electronic signals such as motor current or a temperature signal; and/or image or video data for example from a camera or a LIDAR sensor, e.g., data from sensors of the agent or data from sensors that are located separately from the agent in the environment.

The neural network 110 can have any architecture that is appropriate for the type of network inputs processed by the neural network 110. For example, when the model inputs are images, the neural network 110 can be a convolutional neural network.

The training data 140 that is used by the system 100 to train the neural network 110 includes multiple batches of training inputs 142 and, for each training input, a respective target output 144. Each batch can include, e.g., 64, 128, 256, or 512 inputs. The target output 144 for any given training input 142 is the output that should be generated by the neural network 110 by performing the particular machine learning task on the labeled training input.

Generally, a training engine 150 in the system 100 trains the neural network 110 by performing an iterative training process on batches of training inputs. At each iteration, the training engine 150 receives (i) network outputs 114 generated by the neural network 110 for training inputs 142 in the batch corresponding to the training iteration in accordance with current values of the network parameters 118 and (ii) target outputs 144 for the training inputs 142 in the batch. The training engine 150 uses the network outputs 114 and the target outputs 144 to update the current values of the network parameters 118.

More specifically, conventionally the training engine 150 would train the neural network 110 to minimize a loss function that measures a difference between (i) an output generated by the neural network 110 by processing an input in an input-output pair and (ii) an output in the input-output pair. In conventional training, each input in each input-output pair would be one of the training inputs 142 and the output would be the target output 144 for the training input.

The loss function can be any machine learning loss function that is appropriate for the task that the neural network is being trained to perform. For example, when the task is image classification, the loss function can be the cross-entropy loss function.

Accordingly, the loss function will be referred to in this specification as the "task loss function."

However, to make the trained neural network 110 more secure, i.e., less susceptible to adversarial attack, the training engine 150 regularizes the training using a perturbation engine 160. In other words, the training engine 150 instead trains the neural network 110 on a local linearity regularized loss function that includes one term corresponding to the task loss function and one or more additional regularization terms that measure the non-linearity of the task loss function near the training inputs in the batch.

In particular, at each iteration, the perturbation engine 160 identifies, from a plurality of possible perturbations, a maximally non-linear perturbation for the batch.

A perturbation, as used in this specification, is a set of values that (i) is the same dimensionality as the training inputs, i.e., that includes a corresponding value for each value in a given training input, and (ii) that has a norm, e.g., a Euclidean norm or an infinity norm, that does not exceed a threshold value. A perturbation can be applied to a training input by element-wise adding the perturbation and the training input.

For example, when the inputs are images, the norm is the infinity norm, and pixels take values ranging between 0 and 255, a threshold value of 4/255 would mean that applying a randomly selected perturbation to a training input results in every pixel of the training input being perturbed independently by up to 4 units up or down on the 0 to 255 scale.

As another example, when the inputs are images, the norm is the infinity norm, and pixels take values ranging between 0 and 255, a threshold value of 6/255 would mean that applying a randomly selected perturbation to a training input results in every pixel of the training input being perturbed independently by up to 6 units up or down on the 0 to 255 scale.

The maximally non-linear perturbation is a perturbation for which the task loss function is most non-linear (from among the plurality of possible perturbations that are considered by the perturbation engine 160) when evaluated at an input-output pair that includes (i) a perturbed training input generated by applying the possible perturbation to a given training input and (ii) a target output for the given training input.

At a given iteration, the training engine 150 then determines the update to the current values of the network parameters 118 by performing an iteration of a neural network training procedure to minimize the local linearity regularized loss function, i.e., to decrease losses for the training inputs (as measured by the task loss function) and to decrease the non-linearity of the task loss function for the maximally non-linear perturbation identified by the perturbation engine 160.

Performing an iteration of training and identifying a maximally non-linear perturbation are described in more detail below with reference to FIGS. 2-4.

The training engine 150 can continue performing iterations of the training process to update the values of the network parameters 118 until termination criteria for the training are satisfied, e.g., a specified number of training iterations have been performed, a specified amount of time has elapsed, or the network parameters 118 have converged.

Once the neural network 110 has been trained, the system 100 can provide data specifying the trained network for use in processing new network inputs. That is, the system 100 can output, e.g., by outputting to a user device or by storing in a memory accessible to the system 100, the trained values of the network parameters 118 for later use in processing inputs using the trained network.

Alternatively or in addition to outputting the trained network data, the system 100 can instantiate an instance of the neural network 110 having the trained values of the network parameters 118, receive inputs to be processed, e.g., through an application programming interface (API) offered by the system, use the trained neural network 110 to process the received inputs to generate network outputs and then provide the generated network outputs in response to the received inputs.

Figure 2:
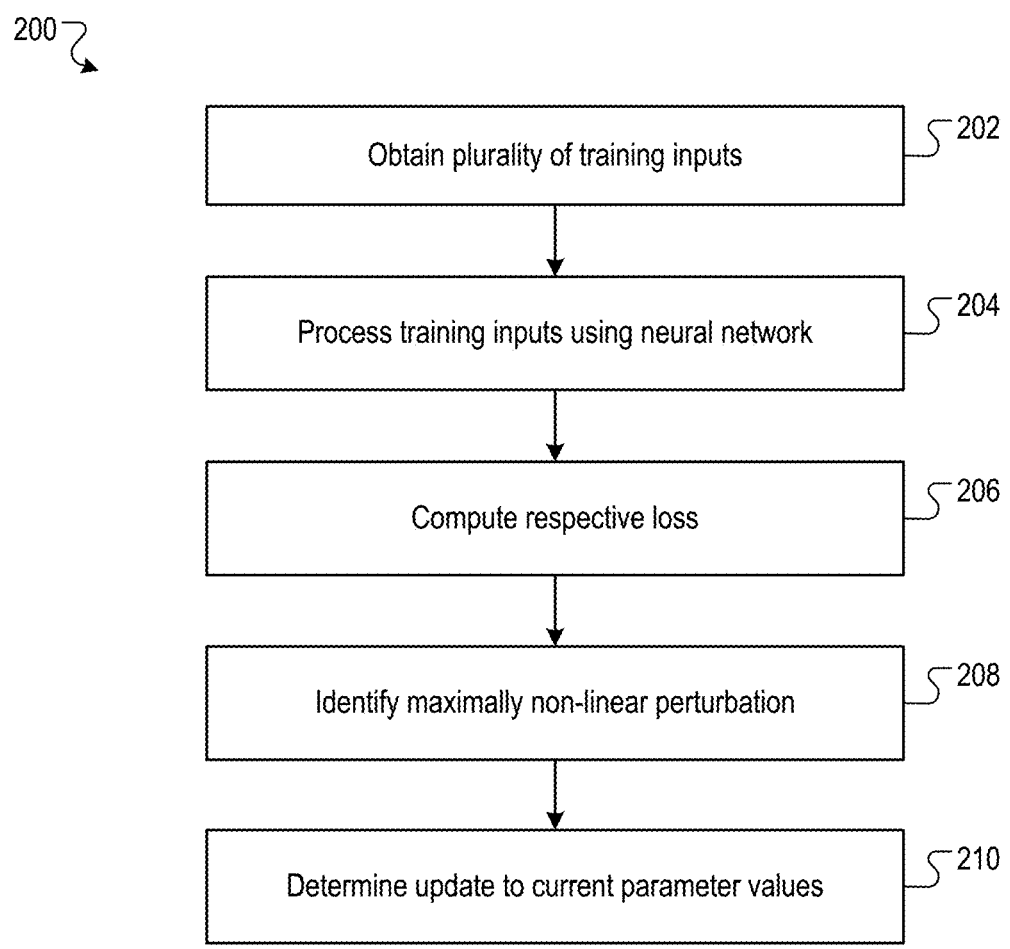
FIG. 2 is a flow diagram of an example process for training the neural network.

FIG. 2 is a flow diagram of an example process 200 for training the neural network. For convenience, the process 200 will be described as being performed by a system of one or more computers located in one or more locations. For example, a neural network training system, e.g., the neural network training system 100 of FIG. 1, appropriately programmed, can perform the process 200.

The system can perform the process 200 multiple times for multiple different batches to determine trained values of the network parameters from initial values of the model parameters, i.e., can perform the process 200 repeatedly at different training iterations of an iterative training process to train the neural network.

The system obtains a plurality of training inputs and, for each of the plurality of training inputs, a respective target output for the training input (step 202).

The system then trains the neural network on each of the plurality of training inputs.

In particular, the system processes each of the training inputs using the neural network and in accordance with the current values of the network parameters to generate a respective network output for each of the training inputs (step 204).

The system computes a respective loss for each of the training inputs (step 206).

In particular, the system computes the respective loss a given training input by evaluating the task loss function for an input-output pair that includes the given training input and the target output for the given training input.

That is, the system evaluates, at the input-output pair that includes the given training input and the target output for the given training input, a loss function that measures a difference between (i) an output generated by the neural network by processing an input in an input-output pair and (ii) an output in the input-output pair.

The system identifies, from a plurality of possible perturbations, a maximally non-linear perturbation (step 208).

As described above, the maximally non-linear perturbation is a perturbation for which the task loss function is most non-linear (from among the possible perturbations) when evaluated at an input-output pair that includes (i) a perturbed training input generated by applying the perturbation to a given training input and (ii) a target output for the given training input.

Identifying the maximally non-linear perturbation is described below with reference to FIG. 3.

The system determines an update to the current values of the parameters of the neural network by performing an iteration of a neural network training procedure to decrease the respective losses for the training inputs and to decrease the non-linearity of the loss function for the identified maximally non-linear perturbation (step 210).

In particular, the system can perform the iteration of the neural network training procedure to minimize a local linearity regularized loss function that measures at least the respective losses for the plurality of training inputs and the non-linearity for the identified maximally non-linear perturbation.

In particular, the system can determine, e.g., through backpropagation, a respective gradient with respect to the network parameters of the local linearity regularized loss function for each of the plurality of training examples and determine an averaged gradient with respect to the network parameters from the respective gradients for the plurality of training examples, i.e., by computing an average of the respective gradients.

The system can then determine an update to the current values of the network parameters from the averaged gradient, e.g., by applying an update rule, e.g., a learning rate, an Adam optimizer update rule, or an rmsProp update rule, to the gradient to generate an update.

The system then generates updated values of the network parameters by applying the update, i.e., by subtracting or adding, to the current values of the network parameters.

Generally, the local linearity regularized loss function includes one term that measures an average loss for the plurality of training examples and one or more terms that are based on the identified maximally non-linear perturbation. For example, the local linearity regularized loss function can be a sum or a weighted sum of the multiple terms.

In particular, the average loss term for a batch i can be expressed as follows:

$$\frac{1}{b}\sum_{j=1}^{b} l(x_{i_j}; y_{i_j}),$$

where b is the total number of training inputs in the batch i, l represents the task loss function, and $l(x_{i_j}; y_{i_j})$ is the task loss function evaluated at the input-output pair that includes the j-th training input $x_{i_j}$ in the batch i and the target output $y_{i_j}$ for the j-th training input $x_{i_j}$ in the batch i.

To measure the non-linearity of the task loss function at the identified maximally non-linear perturbation, the local linearity regularized loss function can include a second term that measures an average across the plurality of training inputs of an absolute difference between (i) the task loss function evaluated at an input-output pair that includes 1) the training input perturbed with the maximally non-linear perturbation and 2) the target output for the training input and (ii) a first-order Taylor expansion of the task loss function evaluated at the input-output pair that includes 1) the training input perturbed with the maximally non-linear perturbation and 2) the target output for the training input. In particular, the second term can be expressed as:

$$\frac{1}{b}\sum_{j=1}^{b} \lambda g(\delta; x_{i_j}, y_{i_j}),$$

$$g(\delta; x_{i_j}, y_{i_j}) = |l(x_{i_j}+\delta, y_{i_j}) - l(x_{i_j}, y_{i_j}) - \delta^T \nabla_{x_{i_j}} l(x_{i_j}, y_{i_j})|,$$

and where δ is the identified maximally non-linear perturbation and λ is the weight assigned to the third term.

In some cases, in addition to the second term, the local linearity regularized loss function can also include a third term that measures the change in loss when the maximally non-linear perturbation is applied to a training input as predicted by the gradient of the loss with respect to the training input.

In particular, the third term can be an average across the plurality of training inputs of an absolute value of a dot product between (i) the maximally non-linear perturbation and (ii) a gradient with respect to the training input of the loss function evaluated at the input-output pair that includes the training input and the target output for the training input. In other words, the third term can be expressed as:

$$\frac{1}{b}\sum_{j=1}^{b} \mu \left| \delta^T \nabla_{x_{i_j}} l(x_{i_j}, y_{i_j}) \right|,$$

where µ is the weight assigned to the third term.

By incorporating the second term and, optionally, the third term into the local linearity regularized loss function, i.e., in addition to the term corresponding to the task loss function, the system can train the system to be robust to adversarial attack in a computationally efficient manner.

Figure 3:
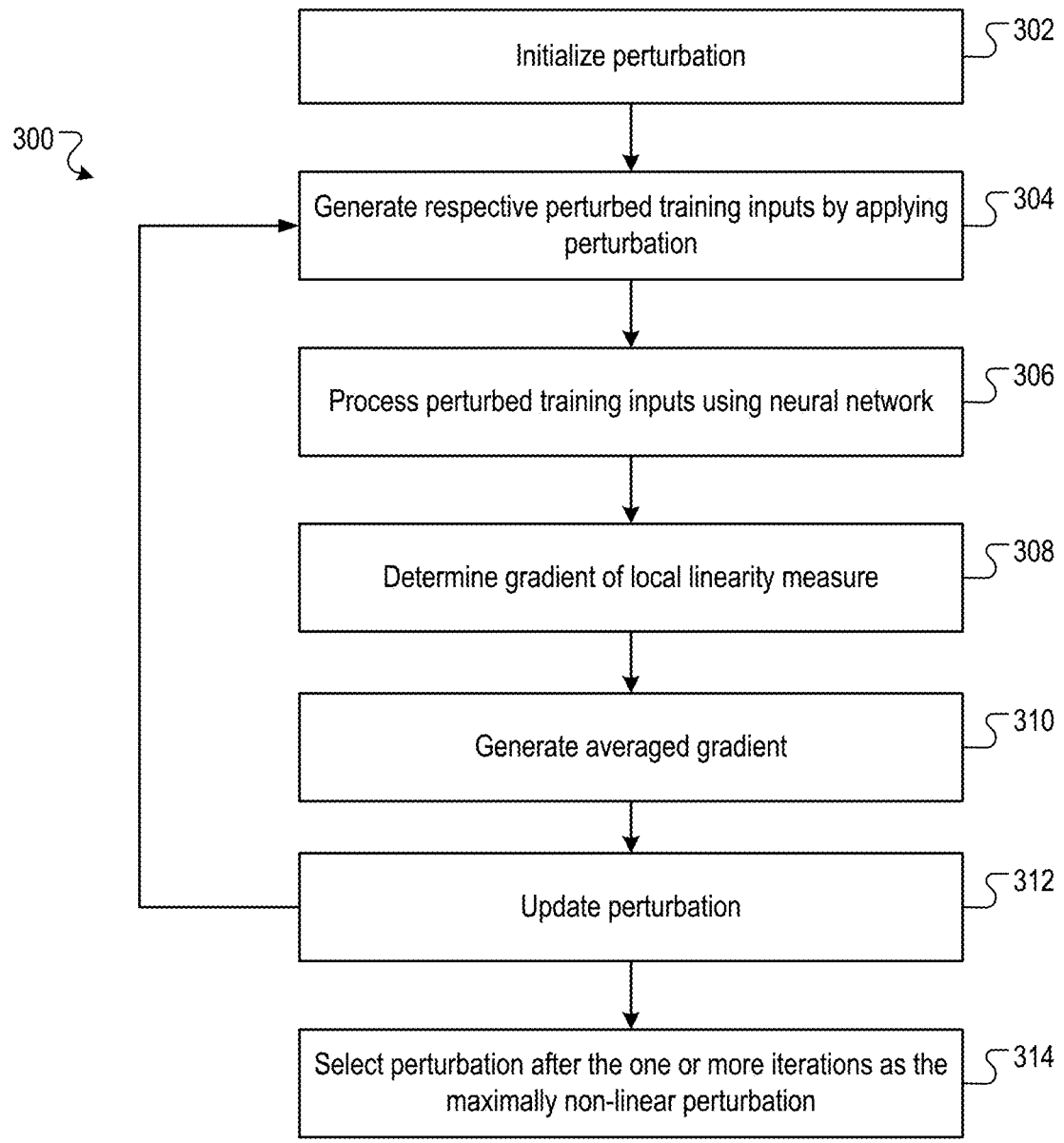
FIG. 3 is a flow diagram of an example process for identifying the maximally non-linear perturbation for a given batch.

FIG. 3 is a flow diagram of an example process 300 for identifying the maximally non-linear perturbation for a given batch. For convenience, the process 300 will be described as being performed by a system of one or more computers located in one or more locations. For example, a neural network training system, e.g., the neural network training system 100 of FIG. 1, appropriately programmed, can perform the process 300.

The system initializes a perturbation (step 302). For example, the system can sample the perturbation uniformly at random from the possible perturbations having a norm that does not exceed the threshold value.

The system then performs one or more iterations of steps 304-312. The number of iterations can be fixed prior to training or can be determined through hyper-parameter search at the outset of training. For example the number of iterations can be equal to 1, 2, 4, 8 or 16.

For each of the training inputs, the system generates a respective perturbed training input by applying the perturbation (as of the current iteration) to the training input (step 304). As described above, the system can apply a perturbation to an input by adding, i.e., element-wise adding, the perturbation and the training input.

For each of the training inputs, the system processes the perturbed training input generated from the training input using the neural network and in accordance with the current values of the network parameters to generate a network output for the perturbed training input (step 306).

For each of the training inputs, the system determines, using the network output for the perturbed training input, a gradient of a local linearity measure with respect to the perturbation and evaluated at the perturbed input for the training input (step 308).

Generally, the local linearity measure measures how non-linear the loss function is when evaluated at an input-output pair that includes (i) the perturbed training input and (ii) the target output for the training input.

As a particular example, the local linearity measure can be an absolute difference between (1) the loss function evaluated at the input-output pair that includes (i) the perturbed training input and (ii) the target output for the training input and (2) a first-order Taylor expansion of the loss function evaluated at the input-output pair. In other words, the local linearity measure g for a given training input x and a perturbation δ can satisfy:

$$g(\delta;x)=|l(x+\delta)-l(x)-\delta^T \nabla_x l(x)|,$$

where $l(x+\delta)$ is the loss function evaluated at the input-output pair that that includes (i) the perturbed training input and (ii) the target output for the training input, $l(x)$ is the loss function evaluated at the input-output pair that that includes (i) the training input and (ii) the target output for the training input, and $\nabla_x l(x)$ is the gradient of $l(x)$ with respect to the training input x.

The system can compute the gradient of the measure with respect to the perturbation using a conventional gradient computation technique, e.g., through backpropagation.

The system generates an averaged gradient of the local linearity measure by averaging the gradients of the local linearity measure for the training inputs (step 310).

The system updates the perturbation using the averaged gradient (step 312). Generally, the system can apply a gradient descent technique to the averaged gradient and the current perturbation to generate an updated perturbation.

For example, the gradient descent technique can be a projected gradient descent (PGD) technique, which updates the perturbation as follows:

δ→Proj(δ−s×Optimizer(gradient)), where gradient the averaged gradient, s is a step size hyperparameter, and Optimizer is an update rule that is applied to the averaged gradient, e.g., the Adam update rule or the rmsProp update rule.

As another example, the technique can be a Fast Gradient Signed Method (FGSM) technique, as described in Ian J. Goodfellow, Jonathon Shlens, and Christian Szegedy. Explaining and harnessing adversarial examples. arXiv preprint arXiv:1412.6572, 2014.

After completing all of the iterations of steps 304-312, the system selects the perturbation after the last iteration of the one or more iterations as the maximally non-linear perturbation (step 314).

Thus, like some existing techniques for training neural networks to be more robust to adversarial attack, the described techniques also require an inner optimization to be performed to identify a perturbation that satisfies some criteria. However, as compared to these existing techniques, many fewer optimization steps (number of iterations of steps 304-312) are required for the described techniques to be effective in training the neural network to be robust to adversarial attack. Because as the number of inner optimization steps increases, the inner optimization becomes the dominant factor in how computationally intensive the training process is, by performing fewer optimization steps the described training techniques become much more computationally efficient than existing techniques.

In particular, because the optimization steps are performed to find the maximally non-linear perturbation and because this non-linear perturbation is then used to regularize the training of the neural network through one or more separate regularization terms in the loss function, robustness to adversarial attack can be achieved in a much more computationally efficient manner than existing techniques that, e.g., perform the inner optimization to identify an adversarial perturbation that results in the largest change in the task loss of any possible perturbation.

Alternatively, if the same number of optimization steps are used to train the network using both the described techniques and the existing techniques, the trained neural network may be more robust to adversarial attacks, i.e., both attacks from a strong adversary and a weak adversary, if trained using the described techniques.

In one example, the total training wall clock time for a network having a threshold value of 4/255 was 7 hours for 110 epochs of training using the described techniques. By comparison, using conventional adversarial training with the same number of inner optimization steps, the total training wall clock time was 36 hours for 110 epochs. Therefore a five times speed-up in training time was achieved. After training, the network trained using the described techniques exhibited better robustness to adversarial attack despite the speed-up in training time.

Figure 4:
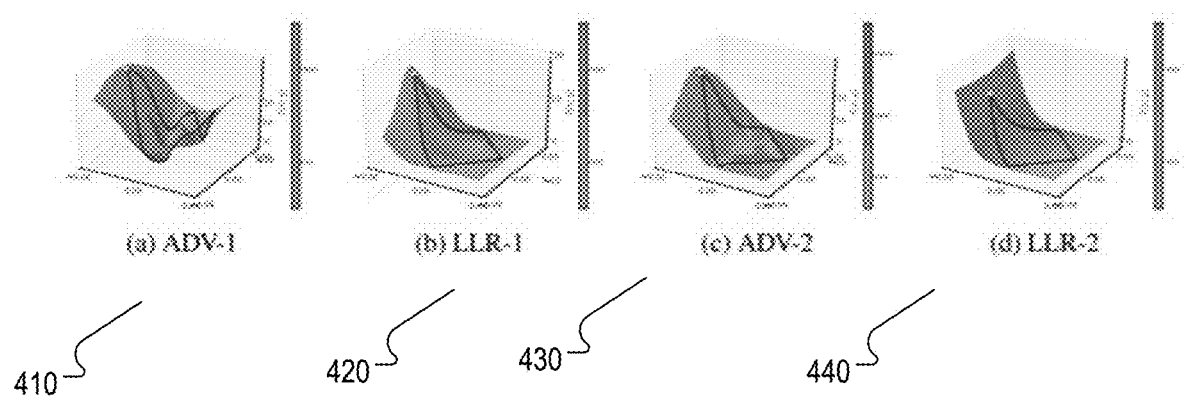
FIG. 4 shows the non-linearity of the loss function around a particular training input.

FIG. 4 shows the non-linearity of the task loss function around a particular training input.

In particular, FIG. 4 shows 4 visualizations of the surface of the task loss around the particular training input.

Visualization 410 shows the surface of the task loss around the particular training input when the neural network has been trained using adversarial training ("ADV") with one inner optimization step (ADV-1). Visualization 420 shows the surface of the task loss around the particular training input when the neural network has been trained using the described techniques ("LLR") with the same number, i.e., one, of inner optimization steps (LLR-1). As can be seen from visualizations 420 and 410, the loss surface is much more linear after training using LLR than after training using ADV with the same number of inner optimization steps.

Visualization 430 shows the surface of the task loss around the particular training input when the neural network has been trained using adversarial training with two inner optimization step (ADV-2). Visualization 440 shows the surface of the task loss around the particular training input when the neural network has been trained using the described techniques with the same number, i.e., two, of inner optimization steps (LLR-2).

Again, as can be seen from visualizations 440 and 430, the loss surface is much more linear after training using LLR than after training using ADV with the same number of inner optimization steps. Moreover, as can be seen by comparing visualization 430 to visualization 420, the loss surface is more linear after one inner optimization step when training using LLR than after two inner optimization steps when training using ADV.

Producing a more linear loss surface avoids having the trained neural network only being robust against weak attacks, i.e., but breaking down under strong adversarial attacks, e.g., due to gradient obfuscation. In particular, one form of gradient obfuscation occurs when the network learns to fool a gradient based attack by making the loss surface highly convoluted and non-linear. In turn the nonlinearity prevents gradient based optimization methods from finding an adversarial perturbation within a small number of iterations and therefore decreases the effectiveness of the training. In contrast, when the loss surface is linear in the vicinity of the training examples, which is to say well-predicted by local gradient information, gradient obfuscation cannot occur. Thus, because the described techniques can generate more linear loss surfaces in fewer inner optimization steps, training using the described techniques yields trained neural networks that are more robust to both strong and weak adversarial attacks than networks trained using other existing techniques.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a network input; and
   processing the network input using a neural network and in accordance with trained values of a plurality of network parameters of the neural network to generate a network output for the network input, wherein:

the trained values of the plurality of network parameters have been determined at least in part by training the neural network on a plurality of training inputs and corresponding target outputs to (i) decrease respective losses for the training inputs that are computed by, for each training input, evaluating a loss function at an input-output pair that includes the training input and the corresponding target output for the training input and (ii) decrease a non-linearity of the loss function for a maximally non-linear perturbation, and the maximally non-linear perturbation is a perturbation from a set of possible perturbations for which the loss function is most non-linear when evaluated at an input-output pair that includes (i) a perturbed training input generated by applying the possible perturbation to a given training input and (ii) a target output for the given training input.

2. The method of claim 1, wherein the loss function measures a difference between (i) an output generated by the neural network by processing an input in an input-output pair and (ii) an output in the input-output pair.

3. The method of claim 1, wherein the network input is an image.

4. The method of claim 1, wherein training the neural network on a plurality of training inputs and corresponding target outputs to (i) decrease respective losses for the training inputs that are computed by, for each training input, evaluating a loss function at an input-output pair that includes the training input and the corresponding target output for the training input and (ii) decrease a non-linearity of the loss function for a maximally non-linear perturbation comprises:

determining an update to current values of the network parameters by performing an iteration of a neural network training procedure to decrease the respective losses for the training inputs and to decrease the non-linearity of the loss function for the maximally non-linear perturbation.

5. The method of claim 1, wherein training the neural network on a plurality of training inputs and corresponding target outputs comprises identifying the maximally non-linear perturbation, comprising:

initializing a perturbation;
for each of one or more iterations:
for each of the training inputs, generating a respective perturbed training input by applying the perturbation to the training input;
for each of the training inputs, processing the perturbed training input using the neural network and in accordance with the current values of the network parameters to generate a network output for the perturbed training input;
for each of the training inputs, determining, using the network output for the perturbed training input, a gradient of a local linearity measure with respect to the perturbation and evaluated at the perturbed input for the training input, wherein the local linearity measure measures how non-linear the loss function is when evaluated at an input-output pair that includes (i) the perturbed training input and (ii) the target output for the training input;
generating an averaged gradient of the local linearity measure by averaging the gradients for the training inputs; and
updating the perturbation using the averaged gradient; and selecting the perturbation after the last iteration of the one or more iterations as the maximally non-linear perturbation.

6. The method of claim 5, wherein the local linearity measure is an absolute difference between (1) the loss function evaluated at the input-output pair that includes (i) the perturbed training input and (ii) the target output for the training input and (2) a first-order Taylor expansion of the loss function evaluated at the input-output pair.

7. The method of claim 1, wherein training the neural network on a plurality of training inputs comprises:

performing an iteration of a neural network training procedure to minimize a local linearity regularized loss function that measures at least the respective losses for the plurality of training inputs and the non-linearity for the identified maximally non-linear perturbation.

8. The method of claim 7, wherein performing the iteration of the neural network training procedure comprises:

determining a respective gradient with respect to the network parameters of the local linearity regularized loss function for each of the plurality of training examples;
determining an averaged gradient with respect to the network parameters from the respective gradients for the plurality of training examples;
determining an update to the current values of the network parameters from the averaged gradient; and
generating updated values of the network parameters by applying the update to the current values of the network parameters.

9. The method of claim 7, wherein the local linearity regularized loss function includes a first term that measures an average loss for the plurality of training examples.

10. The method of claim 7, wherein the local linearity regularized loss function includes a second term that measures an average across the plurality of training inputs of an absolute difference between (i) the loss function evaluated at an input-output pair that includes 1) the training input perturbed with the maximally non-linear perturbation and 2) the target output for the training input and (ii) a first-order Taylor expansion of the loss function evaluated at the input-output pair that includes 1) the training input perturbed with the maximally non-linear perturbation and 2) the target output for the training input.

11. The method of claim 7, wherein the local linearity regularized loss function includes a third term that measures an average across the plurality of training inputs of an absolute value of a dot product between the maximally non-linear perturbation and a gradient with respect to the training input of the loss function evaluated at the input-output pair that includes the training input and the target output for the training input.

12. A system comprising one or more computers and one or more storage devices storing instructions that when executed by the one or more computers cause the one or more computers to perform operations comprising:

receiving a network input; and
processing the network input using a neural network and in accordance with trained values of a plurality of network parameters of the neural network to generate a network output for the network input, wherein:
the trained values of the plurality of network parameters have been determined at least in part by training the neural network on a plurality of training inputs and corresponding target outputs to (i) decrease respective losses for the training inputs that are computed by, for each training input, evaluating a loss function at an input-output pair that includes the training input and the corresponding target output for the training input and (ii) decrease a non-linearity of the loss function for a maximally non-linear perturbation, and the maximally non-linear perturbation is a perturbation from a set of possible perturbations for which the loss function is most non-linear when evaluated at an input-output pair that includes (i) a perturbed training input generated by applying the possible perturbation to a given training input and (ii) a target output for the given training input.

13. The system of claim 12, wherein the loss function measures a difference between (i) an output generated by the neural network by processing an input in an input-output pair and (ii) an output in the input-output pair.

14. The system of claim 12, wherein the network input is an image.

15. The system of claim 12, wherein training the neural network on a plurality of training inputs and corresponding target outputs to (i) decrease respective losses for the training inputs that are computed by, for each training input, evaluating a loss function at an input-output pair that includes the training input and the corresponding target output for the training input and (ii) decrease a non-linearity of the loss function for a maximally non-linear perturbation comprises:

determining an update to current values of the network parameters by performing an iteration of a neural network training procedure to decrease the respective losses for the training inputs and to decrease the non-linearity of the loss function for the maximally non-linear perturbation.

16. The system of claim 12, wherein training the neural network on a plurality of training inputs and corresponding target outputs comprises identifying the maximally non-linear perturbation, comprising:

initializing a perturbation;
for each of one or more iterations:
for each of the training inputs, generating a respective perturbed training input by applying the perturbation to the training input;
for each of the training inputs, processing the perturbed training input using the neural network and in accordance with the current values of the network parameters to generate a network output for the perturbed training input;
for each of the training inputs, determining, using the network output for the perturbed training input, a gradient of a local linearity measure with respect to the perturbation and evaluated at the perturbed input for the training input, wherein the local linearity measure measures how non-linear the loss function is when evaluated at an input-output pair that includes (i) the perturbed training input and (ii) the target output for the training input;
generating an averaged gradient of the local linearity measure by averaging the gradients for the training inputs; and
updating the perturbation using the averaged gradient; and selecting the perturbation after the last iteration of the one or more iterations as the maximally non-linear perturbation.

17. The system of claim 16, wherein the local linearity measure is an absolute difference between (1) the loss function evaluated at the input-output pair that includes (i) the perturbed training input and (ii) the target output for the training input and (2) a first-order Taylor expansion of the loss function evaluated at the input-output pair.

18. The system of claim 12, wherein training the neural network on a plurality of training inputs comprises:

performing an iteration of a neural network training procedure to minimize a local linearity regularized loss function that measures at least the respective losses for the plurality of training inputs and the non-linearity for the identified maximally non-linear perturbation.

19. The system of claim 18, wherein performing the iteration of the neural network training procedure comprises:

determining a respective gradient with respect to the network parameters of the local linearity regularized loss function for each of the plurality of training examples;
determining an averaged gradient with respect to the network parameters from the respective gradients for the plurality of training examples;
determining an update to the current values of the network parameters from the averaged gradient; and
generating updated values of the network parameters by applying the update to the current values of the network parameters.

20. One or more non-transitory computer-readable storage media storing instructions that when executed by one or more computers cause the one or more computers to perform operations comprising:

receiving a network input; and
processing the network input using a neural network and in accordance with trained values of a plurality of network parameters of the neural network to generate a network output for the network input, wherein:
the trained values of the plurality of network parameters have been determined at least in part by training the neural network on a plurality of training inputs and corresponding target outputs to (i) decrease respective losses for the training inputs that are computed by, for each training input, evaluating a loss function at an input-output pair that includes the training input and the corresponding target output for the training input and (ii) decrease a non-linearity of the loss function for a maximally non-linear perturbation, and
the maximally non-linear perturbation is a perturbation from a set of possible perturbations for which the loss function is most non-linear when evaluated at an input-output pair that includes (i) a perturbed training input generated by applying the possible perturbation to a given training input and (ii) a target output for the given training input.

* * * * *